(12) United States Patent
Waldner

(10) Patent No.: US 8,373,103 B2
(45) Date of Patent: Feb. 12, 2013

(54) MAGNETIC AIR HEATING AND IMPELLING APPARATUS

(76) Inventor: George Waldner, Garden City, SD (US)

( * ) Notice: Subject to any disclaimer, the term of this patent is extended or adjusted under 35 U.S.C. 154(b) by 518 days.

(21) Appl. No.: 12/768,910

(22) Filed: Apr. 28, 2010

(65) Prior Publication Data

US 2011/0268430 A1    Nov. 3, 2011

(51) Int. Cl.
*H05B 6/10* (2006.01)
*F24H 3/02* (2006.01)

(52) U.S. Cl. ........ 219/631; 219/628; 219/630; 219/672; 219/601; 219/600; 392/397; 416/95

(58) Field of Classification Search .................. 219/631, 219/628, 630, 672, 601, 600; 392/397; 416/95
See application file for complete search history.

(56) References Cited

U.S. PATENT DOCUMENTS

| | | | |
|---|---|---|---|
| 5,012,060 A | 4/1991 | Gerard | |
| 5,914,065 A | 6/1999 | Alavi | |
| 6,011,245 A | 1/2000 | Bell | |
| 6,144,020 A | 11/2000 | Usui | |
| 6,177,660 B1 | 1/2001 | Usui | |
| 6,297,484 B1 | 10/2001 | Usui | |
| 7,339,144 B2 | 3/2008 | Lunneborg | |
| 7,420,144 B2 | 9/2008 | Lunneborg | |
| 7,573,009 B2 | 8/2009 | Lunneborg | |
| 2003/0066830 A1 | 4/2003 | Reed | |
| 2008/0099467 A1 | 5/2008 | Lunneborg | |

*Primary Examiner* — Shawntina Fuqua
(74) *Attorney, Agent, or Firm* — Jeffrey A. Proehl; Woods, Fuller, Shultz & Smith, P.C.

(57) ABSTRACT

An apparatus for heating and impelling air comprises a housing, an air heating impeller assembly, and a magnetic assembly. The impeller assembly may impel air through the housing and heat the air, and may include a support shaft, a plurality of annular disks positioned along the support shaft and each having a central aperture through which the support shaft extends. The impeller assembly includes paddles radiating outwardly from the shaft, and each of the paddles is positioned between the shaft and the disks to space at least one disk from the support shaft to form an air path therebetween. The paddles space the disks in an axial direction to form gaps therebetween to form an air path between the disks. The magnetic assembly applies a magnetic field of adjustable intensity to the disks to cause heating of the disks.

12 Claims, 11 Drawing Sheets

MAGNETIC AIR HEATING AND IMPELLING APPARATUS

BACKGROUND

Field

The present disclosure relates to air heating apparatus and more particularly pertains to a new magnetic air heating and impelling apparatus.

SUMMARY

Generally, the present disclosure describes a new magnetic air heating and impelling apparatus.

The present disclosure relates to an apparatus for heating and impelling air. The apparatus may comprise a housing having an interior and an air inlet and an air outlet, and an air heating impeller assembly positioned in the interior and configured to impel air through the housing and heat the air moving through the housing between the air inlet and air outlet. The impeller assembly may be rotatable about an axis of rotation. The air heating impeller assembly may comprise a support shaft extending along the axis of rotation and having an outer surface. The impeller assembly may comprise a plurality of annular disks positioned along the support shaft. Each of the annular disks has a central aperture defined by an aperture edge, and the support shaft extends through the central aperture of the disks. The impeller assembly further includes a plurality of paddles radiating outwardly from the axis of rotation. Each of the paddles may be positioned between the support shaft and the annular disks to space the aperture edge of at least one of the disks from the outer surface of the support shaft to form a portion of an air path between the support shaft and the at least one disk. The paddles may space the disks from each other in an axial direction to form gaps between the disks to form a portion of the air path between the paddles. The apparatus may also include a magnetic assembly configured to apply a magnetic field of adjustable intensity to the disks to cause heating of the disks.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components, and the particulars of the steps, set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
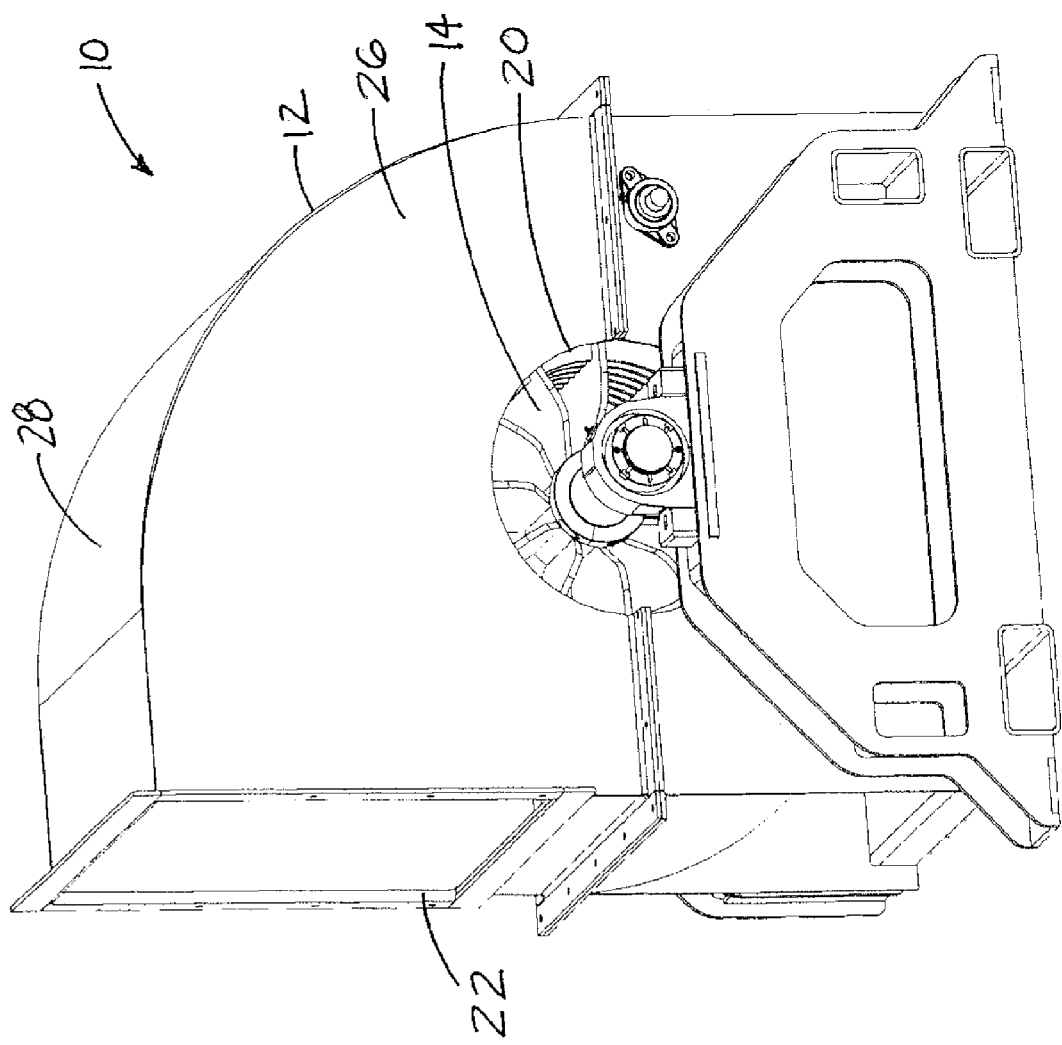
FIG. 1 is a schematic perspective view of one embodiment of a new magnetic air heating and impelling apparatus according to the present disclosure.
Figure 2A:
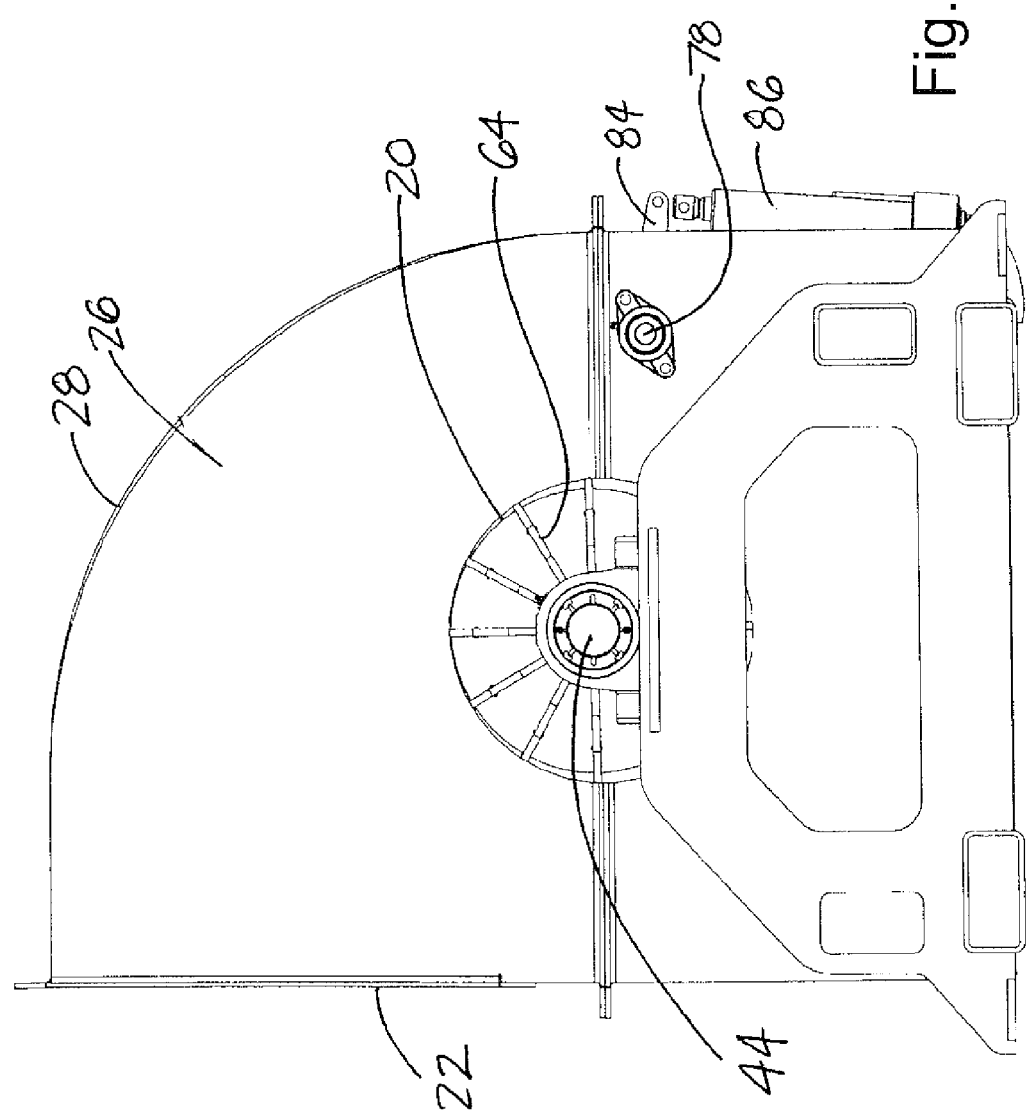
FIG. 2A is a schematic first side view of the apparatus of the illustrative embodiment.
Figure 2B:
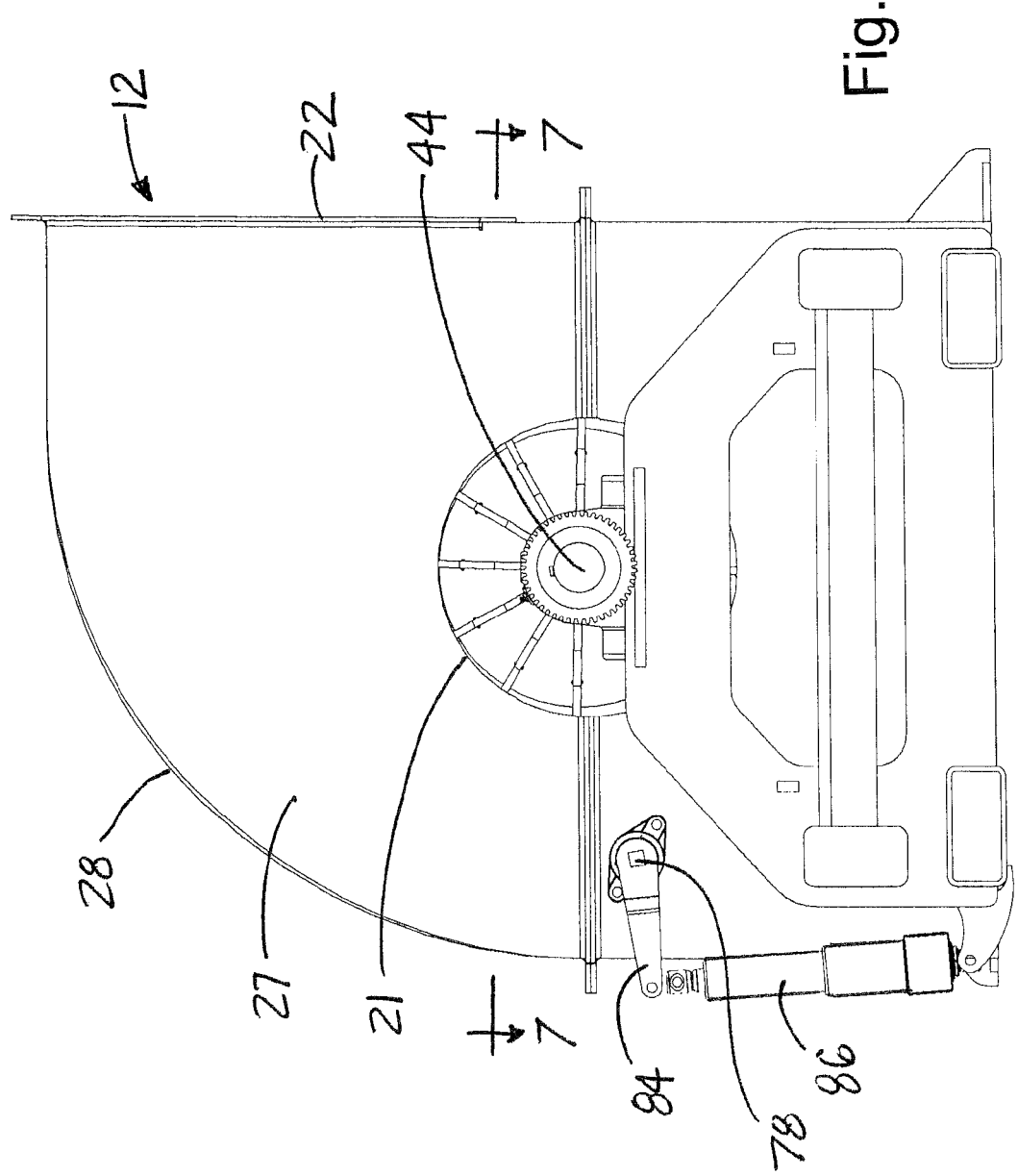
FIG. 2B is a schematic second side view of the apparatus of the illustrative embodiment.
Figure 3:
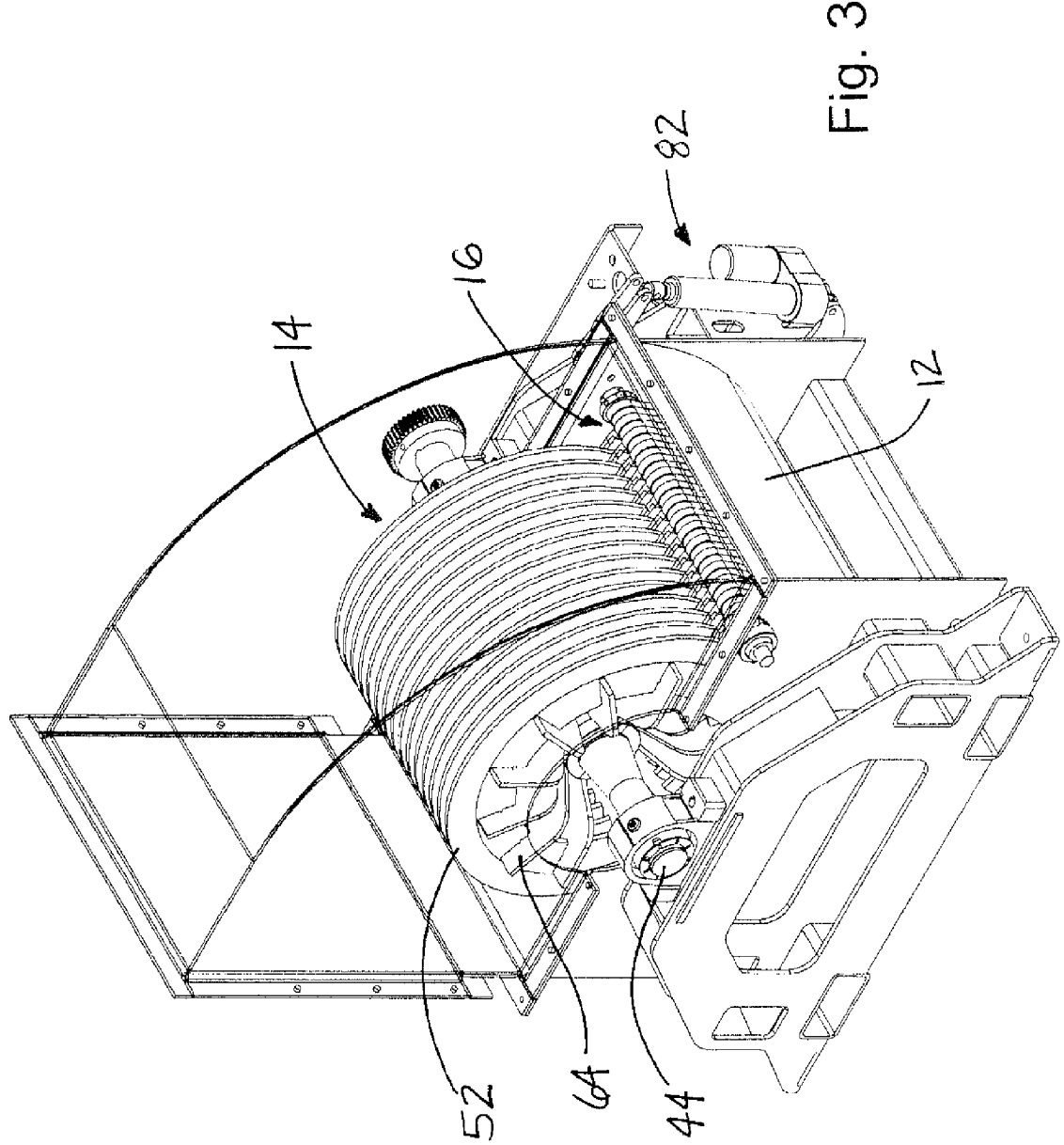
FIG. 3 is a schematic perspective view of the apparatus of the illustrative embodiment with an upper portion of the housing shown in phantom to reveal detail of the impeller assembly.
Figure 4:
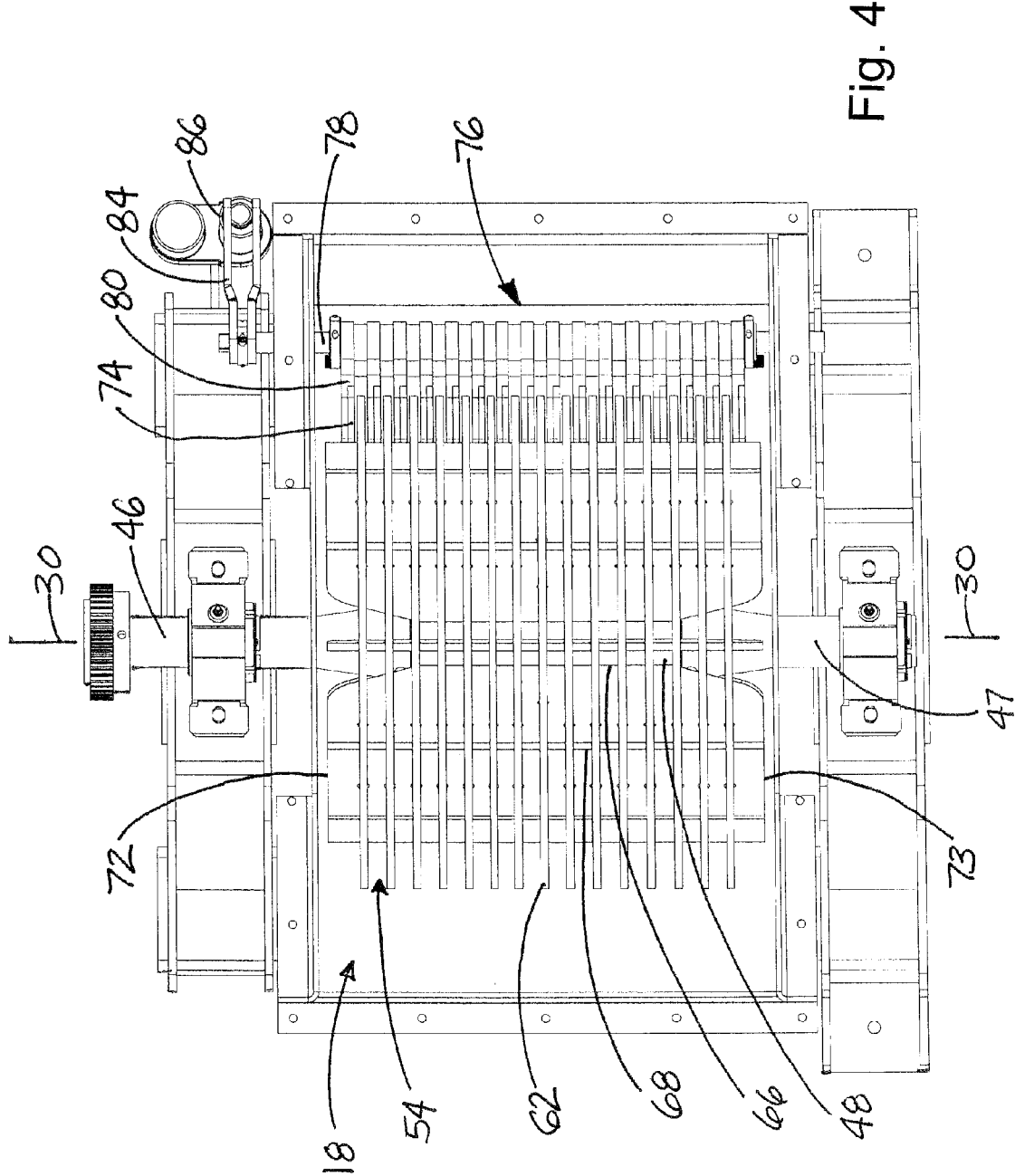
FIG. 4 is a schematic top view of the apparatus of the illustrative embodiment with an upper portion of the housing removed to reveal detail.
Figure 5:
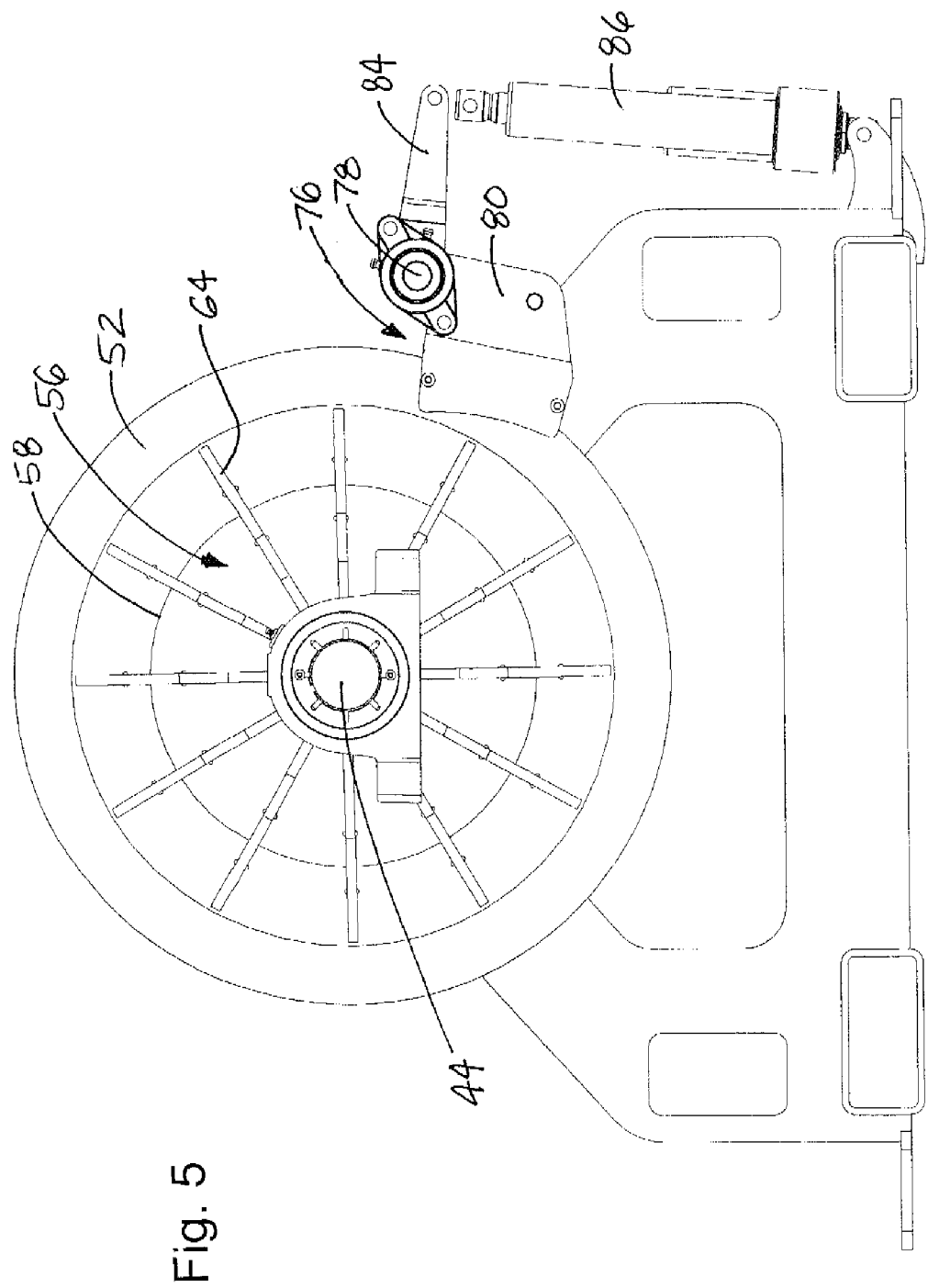
FIG. 5 is a schematic side view of the impeller assembly of the illustrative embodiment with the housing removed.
Figure 6:
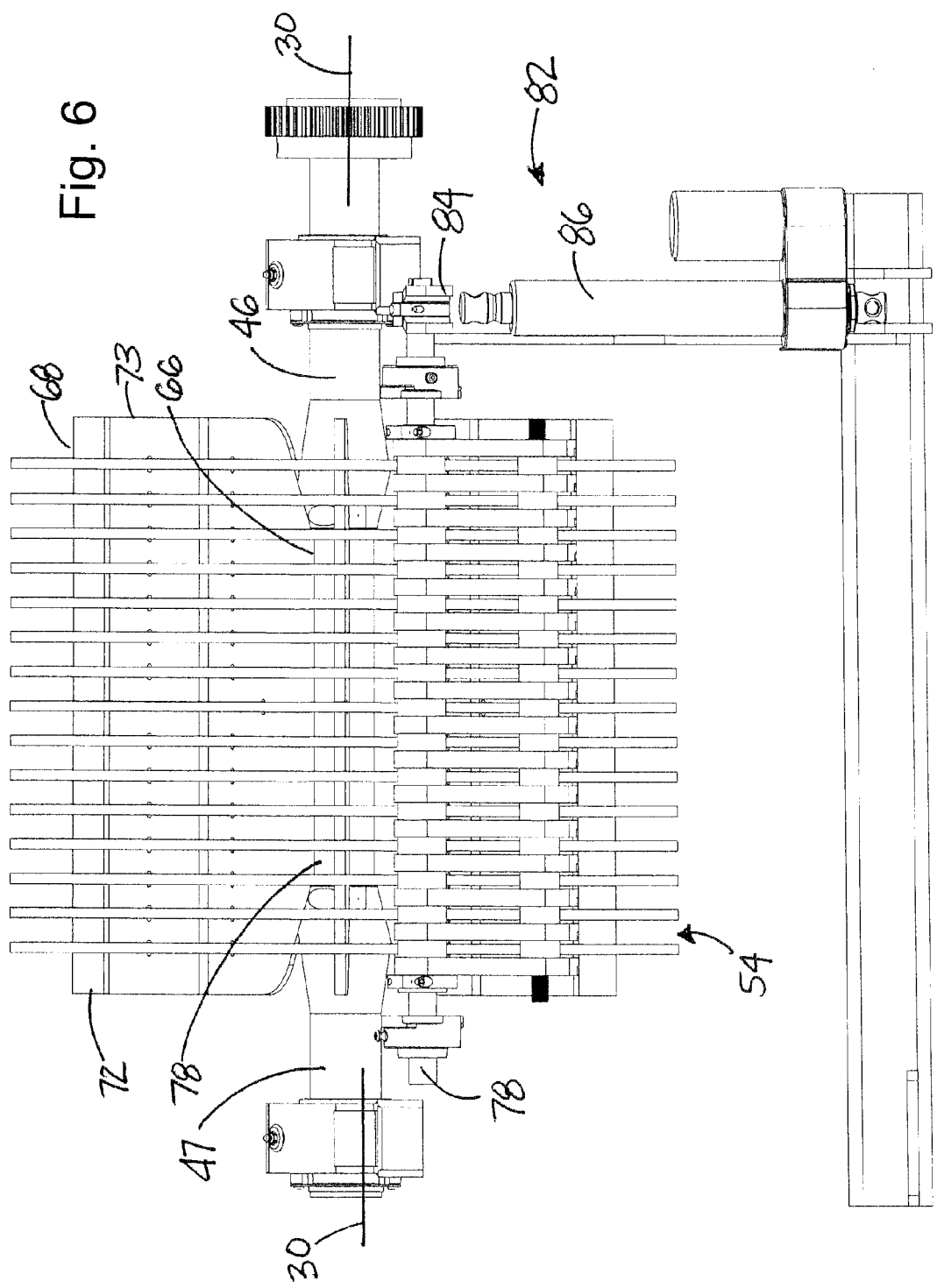
FIG. 6 is a schematic front view of the impeller assembly of the illustrative embodiment with the housing removed.
Figure 7:
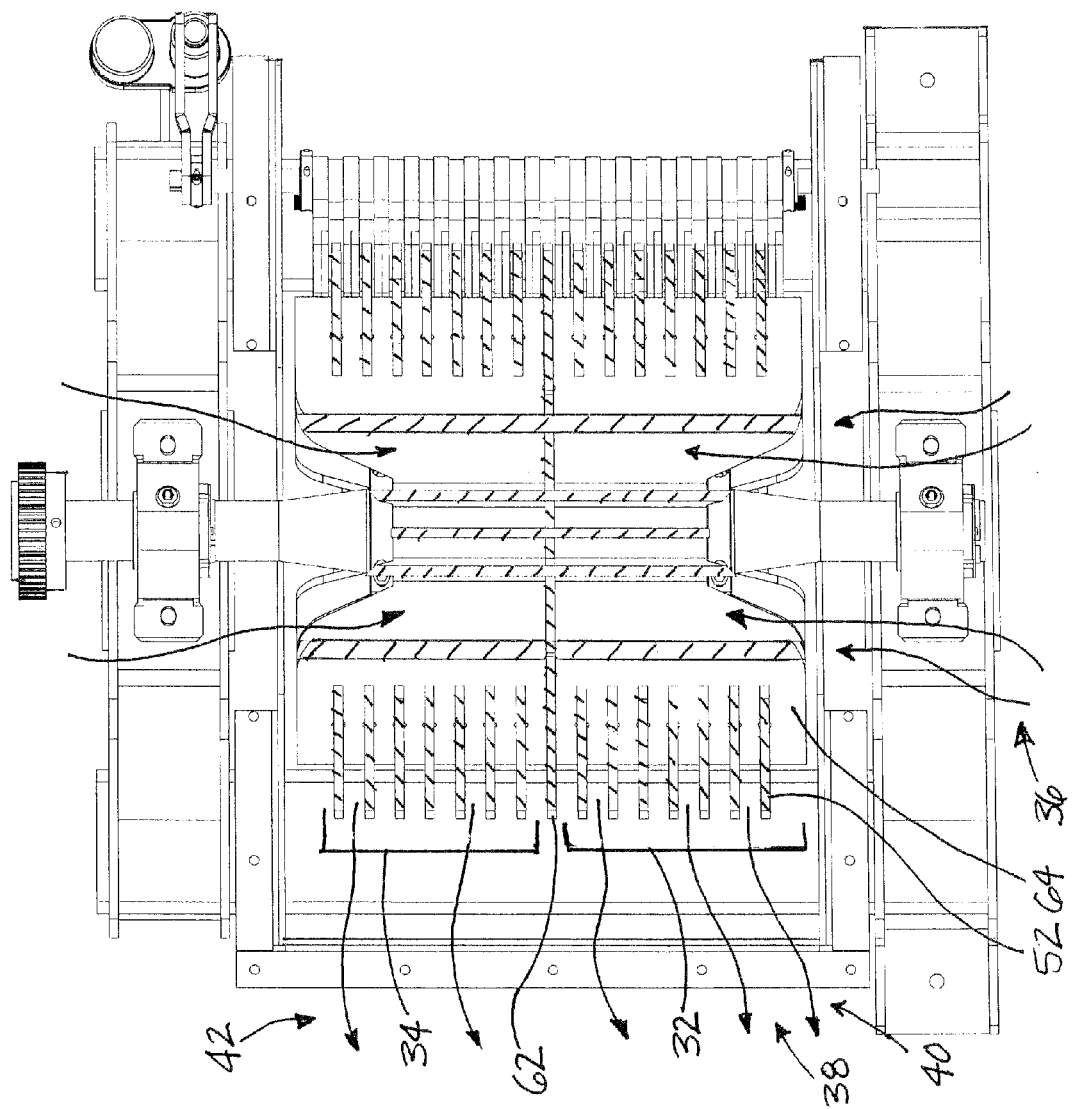
FIG. 7 is a schematic top sectional view of the apparatus taken along line 7-7 of FIG. 2B.
Figure 8:
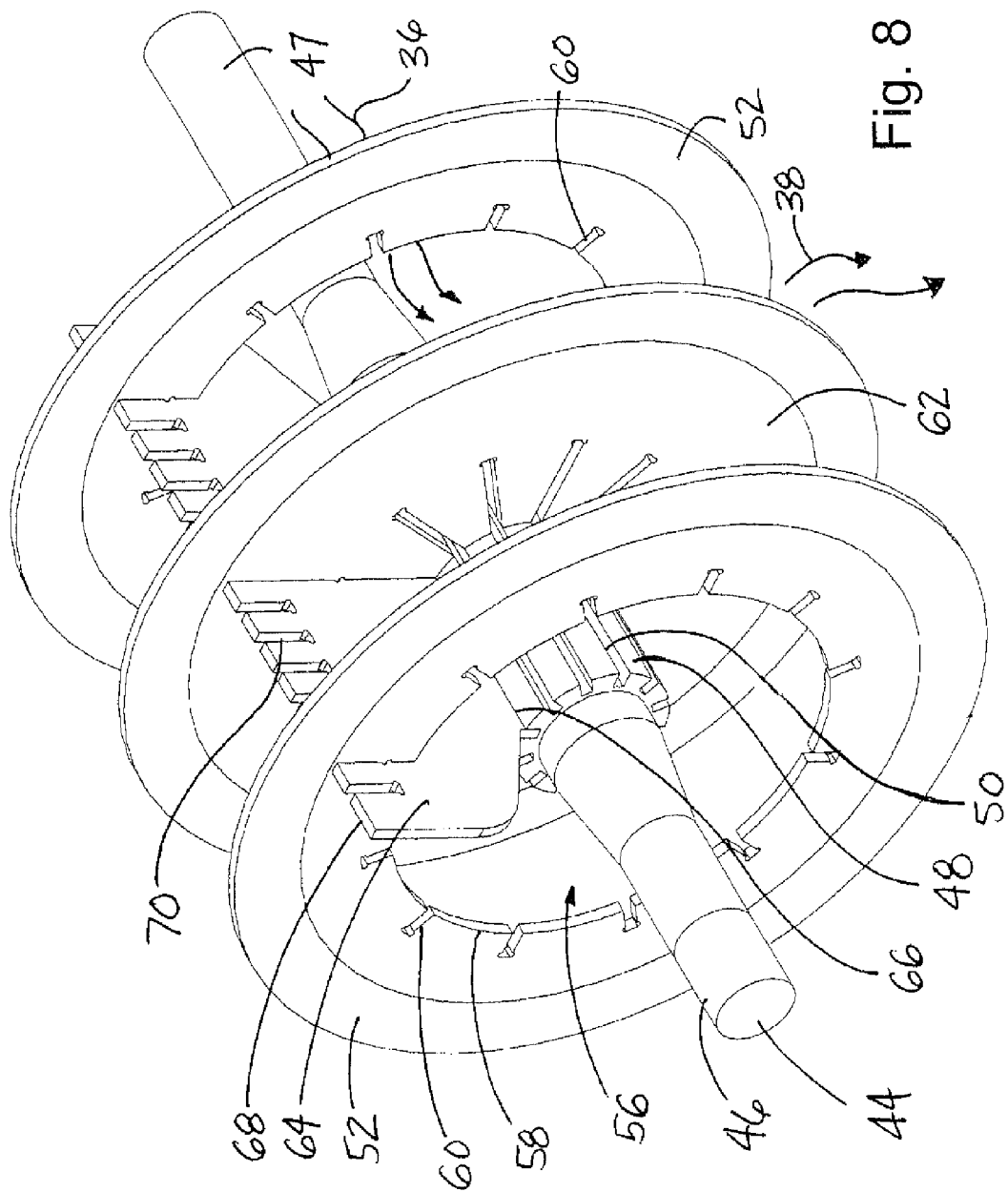
FIG. 8 is a schematic perspective view of the impeller assembly with all but one paddle removed and all but three of the disks removed for the purposes of further illustrating aspects of the apparatus.

With reference now to the drawings, and in particular to FIGS. 1 through 10 thereof, a new magnetic air heating and impelling apparatus embodying the principles and concepts of the disclosed subject matter will be described.

The disclosure relates to an apparatus 10 for heating and impelling air, and is highly suitable for use with an energy source providing rotational movement that comprises, for example, an internal combustion engine or an electric motor. The apparatus 10 may function to impel a flow of air through the apparatus and heating the flow of air as the air passes through the apparatus, and significantly, the heating and impelling functions may be produced or aided by the same structure.

The apparatus 10 may comprise, in a general sense, a housing 12, an air heating impeller assembly 14 positioned in the housing, and a magnetic assembly 16 for adjustably inducing heating of a portion of the impeller assembly.

In greater detail, the apparatus 10 includes a housing 12 that defines an interior 18 and an air inlet 20 and an air outlet 22 that are in fluid communication with the interior. For the purposes of this description, the air inlet 20 forms the begging of an air path 24 and the air outlet 22 forms the end of the air path, although it will be understood that the air path may continue before and after the inlet 20 and outlet 22. The air inlet and air outlet may be characterized by an opening formed in the housing 12. In some embodiments, the air inlet 20 may comprise a pair of air inlets, and will be referred to a first air inlet 20 and a second air inlet 21. The first 20 and second 21 air inlets may be positioned on opposed locations on the housing, and in such embodiments, the air pat begins at each of the air inlets 20, 21 and combines to exit at the air outlet 22.

The housing 12 may have a pair of opposed side walls 26, 27, and the air inlets 20, 21 may be located on the respective opposed side walls. The housing 12 may also have a perimeter wall 28 that extends between the side walls 26, 27, and the air outlet 22 may be located in the perimeter wall. The housing 12 may have a volute shape, although this is not critical to the invention.

The air heating impeller assembly 14 may be positioned in the housing 12, and may be configured to impel air through the interior of the housing and heat the air moving through the housing. In the most preferred embodiments, the impeller assembly 14 may simultaneously impel and heat the air, such that the air is heated by the impeller assembly as the air is being impelled by the impeller assembly. The impeller assembly 14 may be rotatable with respect to the housing 12 about an axis of rotation 30. The impeller assembly 14 may be located between the openings of the air inlets 20, 21 of the housing. The impeller assembly 14 may have a first portion 32 and a second portion 34. The first portion 32 may be located adjacent to the first air inlet 20 and the second portion 34 may be located adjacent to the second air inlet 21. The first 32 and second 34 portions may be employed to create two distinct and separate air path portions which are described below in greater detail.

The impeller assembly 14 may define a portion of the air path 24, and portion of the air path through the impeller assembly may include a first air path section 36 that extends axially, and thus may extend substantially parallel to the axis of rotation 30 of the impeller assembly. The air path 24 may also include a second air path section 38 that extends radially outward with respect to the axis of rotation 30, and thus away from the axis of rotation. Further, the impeller assembly 14 may define a pair of the air path portions 40, 42, with each portion 40, 42 including a first air path section 36 and a second air path section 42. The pair of air path portions comprising a first air path portion 40 and a second air path portion 42. The first air path portion may be defined by the first portion 32 of the impeller assembly and the second air path portion may be defined by the second portion 34 of the impeller assembly.

The air heating impeller assembly may comprise a support shaft 44 that extends along the axis of rotation 30. In some embodiments, the support shaft 44 may extend between the air inlets 20, 21. The support shaft 44 may be supported on bearings mounted on the housing to permit rotation of the shaft with respect to the housing. The support shaft 44 has opposite end sections 46, 47 and a central section 48, and the end sections may be journalled in the bearings.

The support shaft may have a plurality of grooves 50 formed therein, such as on the central section 48, and the grooves may extend axially on the support shaft. The grooves 50 may be substantially equally circumferentially spaced about the central section of the shaft, although this is not a critical requirement.

The air heating impeller assembly 14 may also comprise a plurality of annular disks 52 which are positioned along the support shaft 44 and may be spaced from each other in an axial direction to form gaps 54 therebetween. Each of the annular disks 52 has a central aperture 56 which is defined by an aperture edge 58 that may be substantially circular in shape. The support shaft 44 may extend through the central aperture 56 of the disks, and each of the disks may be oriented substantially perpendicular to the axis of rotation 30 of the impeller assembly. The disks 52 are at least partially formed of a conductive material which is susceptible to inductive heating as it passes through a magnetic field. The disks 52 may have one or more interlocking notches 60 formed therein which may extend radially outwardly from the central aperture 56, and the notches 60 may be in communication with the aperture edge 58.

The plurality of disks 52 may include a blocking disk 62 to block axial movement of air along the first air path section 36 of one or both of the first 40 and second 42 air path portions. The blocking disk 62 may be positioned between the first 32 and second 34 portions of the impeller assembly, and may be positioned between the first 40 and second 42 air path portions. The aperture edge 58 of the blocking disk 62 may be positioned adjacent to the central section 48 of the support shaft 44 such that air moving along the air path portions 40, 42 is not able to pass between the aperture edge 58 of the blocking disk and the outer surface of the support shaft 44.

The air heating impeller assembly 14 may further comprise a plurality of paddles 64 for moving air in the radially outward direction of the second air path section 38. Each of the paddles 64 may radiate outwardly from the axis of rotation 30, and may radiate outwardly from the support shaft 44. Each paddle 64 may define a plane that bisects the support shaft 44. The paddles 64 may have at least a portion that is positioned between the support shaft 44 and the annular disks 52. Each of the paddles 64 has an inner edge 66 that may engage one of the grooves 50 in the support shaft 44, such as by being inserted into one of the grooves. Each of the paddles 64 also has an outer edge 68, and a plurality of slots 70 may be formed in each of the paddles. The slots 70 may extend from the outer edge 68 toward the inner edge 66 of the paddles, although the slots do not reach the inner edge. The slots 70 may engage the interlocking notches 60 formed in the disks, with the notches 60 and slots 70 being interlocked by mutual insertion. By this structure, the engagement of the paddles to the disks may function to space the disks apart from each other in the axial direction along the support shaft, and may be the sole structure maintaining the spacing. A central slot 72 in the paddles 64 may engage the blocking disk 62.

Each of the paddles has a pair of side edges 72, 73 that extend between the inner 66 and outer 68 edges, and the width of the paddles may be defined as the distance between the side edges. In some embodiments, the width of the paddle may taper narrower toward the inner edge 66 and expand wider toward the outer edge 68.

The magnetic assembly 16 may be configured to apply a magnetic field of adjustable intensity to the impeller assembly 14, and more specifically the disks of the assembly. The magnetic assembly 16 may include a plurality of magnetic elements 74 that are positioned adjacent to the disks, and may be positioned in the gaps 54 between the disks. In some of the most preferred embodiments, the magnetic elements are permanent magnets, and may be of rare earth composition. In other embodiments, the magnetic elements 74 may be electromagnetic elements.

The magnetic assembly 16 may further include a support structure 76 supporting the plurality of magnetic elements with respect to the disks 52. The support structure 76 may support the magnetic elements 74 in the gaps 54 between the disks, and may be configured to move the magnetic elements 74 between a maximum exposure position and a minimum exposure position. The maximum exposure position may be characterized by the magnetic element 74 being relatively closer to the axis of rotation, and minimum exposure position may be characterized by the element 74 being relatively further away from the axis of rotation.

In some embodiments, the support structure 76 may comprise a pivot shaft 78 that may be pivotally mounted on the housing. The support structure 76 may also comprise a plurality of mounting plates 80 mounted on the pivot shaft and being pivotable with the pivot shaft. At least one of the magnetic elements 74 may be mounted on each of the mounting plates 80, and the mounting plates along with the magnetic elements may be movable toward and away from the axis of rotation. The support structure may further comprise an actuator assembly 82 for pivoting the pivot shaft 78 to adjust the amount of exposure of the disks to the magnetic elements. In some implementations, the actuator assembly 82 may include a pivot arm 84 that is mounted on the pivot shaft 78 in a manner such that the arm pivots with the pivot shaft. The actuator assembly 82 may further include an actuator 86 that acts on the pivot arm to pivot the pivot shaft and move the magnetic elements with respect to the conductive disks. The actuator 86 may be connected to the pivot arm 84 and the housing 12 to cause pivoting of the pivot shaft with respect to the housing. In some implementations, the actuator 86 may comprise a linear actuator, although other actuators, including rotary actuators, may be used to move the pivot shaft.

In some embodiments, the magnetic assembly 16 may maintain a gap of approximately ⅛ inch between the magnetic elements and the surface of the disks, but it will be recognized that the gap may be larger or smaller, with smaller gap sizes enhancing the heating effect on the disks.

The process of assembly of the apparatus 10, and in particular the air heating impeller assembly 14, will now be described. In an illustrative process, the disks 52 of the assembly 14 may be positioned in a spaced and substantially parallel arrangement such that the central apertures 56 are aligned. Each paddle 64 may be moved into the aligned apertures 56 of the disks, and the each of the slots 70 of the paddles may be aligned with a corresponding one of the interlocking notches 60 of the disks. The paddles may be moved radially outward until the full depth of the slots of the paddles substantially fully engage the notches of the disks. Once each of the paddles has been engaged with the disks, the disks are held in position with respect to each other in the spaced and substantially parallel, and axially aligned, arrangement. The support shaft 44 may then be inserted into the space between the paddles. The insertion of the support shaft 44 into the space between the radiating paddles may serve to force the paddles into the proper positions with respect to the disks with the slots of the paddles substantially fully engaged with the interlocking notches. The grooves 50 of the support shaft may be aligned with the inner edges 66 of the paddles, and the support shaft may be forced or driven into the space, particularly if there is a small degree of interference between the shaft and the paddles. Thus, the paddles 64 are held in position between the support shaft 44 and the annular disks 52, and the disks help to secure the paddles against flying outward from the shaft should a failure of the paddles occur while the impeller assembly is rotating at high speeds. Furthermore, the heating of the elements of the impeller assembly tends to enlarge the elements in physical size, and this tends to increase the tightness of the fit of the parts together. Also, the use of welds to hold the parts of the impeller assembly together is thus avoided.

Advantageously, the impeller assembly 14 both provides heat to, and impels, the air in a single unit, without requiring a distinct and separate fan or air blowing element. The magnetic elements are relatively stationary in that they are not a part of the structure that is rotated at high speeds. The disks provide a large surface area for the transfer of heat to the air as the air is moving outwardly from the axial space extending between the support shaft and the disks. The intimate connection between the disks 52 and the paddles 64 may cause a degree of heating of the paddles to further increase the surface area available to heat the air as it moves through the impeller assembly.

Figure 9:
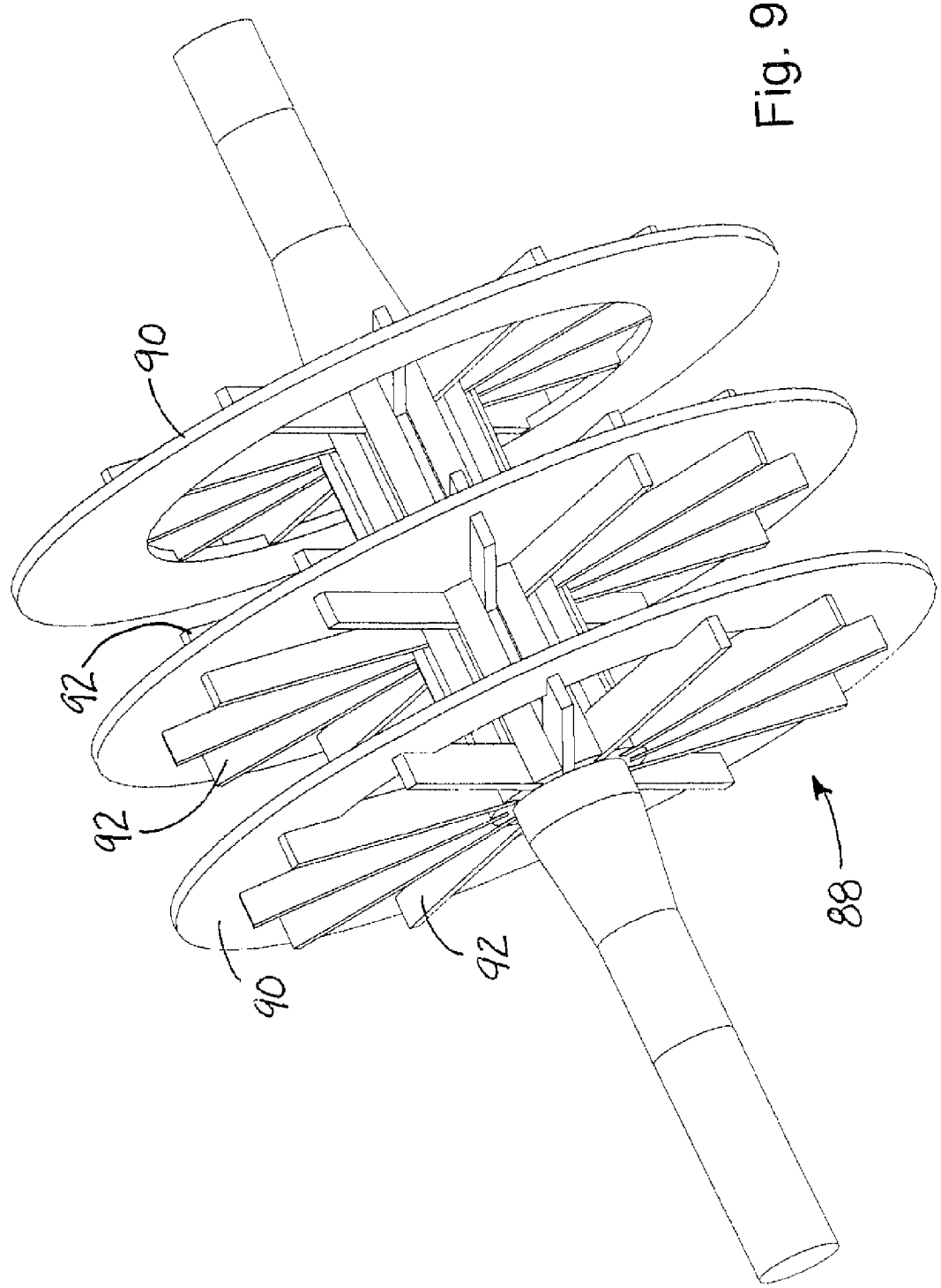
FIG. 9 is a schematic perspective view of another embodiment of the impeller assembly with a number of the plate portions and fin portions omitted to show the detail of the remaining enhanced disks.

While the disks 52 are suitably formed from a sheet metal material, the functionality of the disks and paddles may be performed by structures that are formed by other means and with other shapes. For example, as shown in FIG. 9, an enhanced disk 88 is illustrated which includes an annular plate portion 90 and a plurality of fin portions 92 that are formed on one or both faces of the plate portion and that radiate outwardly from the central aperture of the enhanced disks 88 to perform the function of the paddles, which may be eliminated in this variation. The fin portions may extend into the central aperture to engage grooves in the surface of the support shaft and support the disk on the shaft, while providing a space between the outer surface of the support shaft and the aperture edge to permit air to flow axially along the shaft. In such embodiments, it may be desirable to cast the annular plate portion and the fin portions in a single piece. The fin portions may be formed on one face of the plat portion, and may serve to space the plate portions of adjacent enhanced disks from each other on the support shaft.

In some embodiments of the impeller assembly 14, the size or diameter of the central aperture may be varied among the disks, so that, for example, the disks closer to the end portions of the support shaft have relatively larger diameter apertures, while the disks closer to the blocking disk 62 have relatively smaller diameter apertures.

Figure 10:
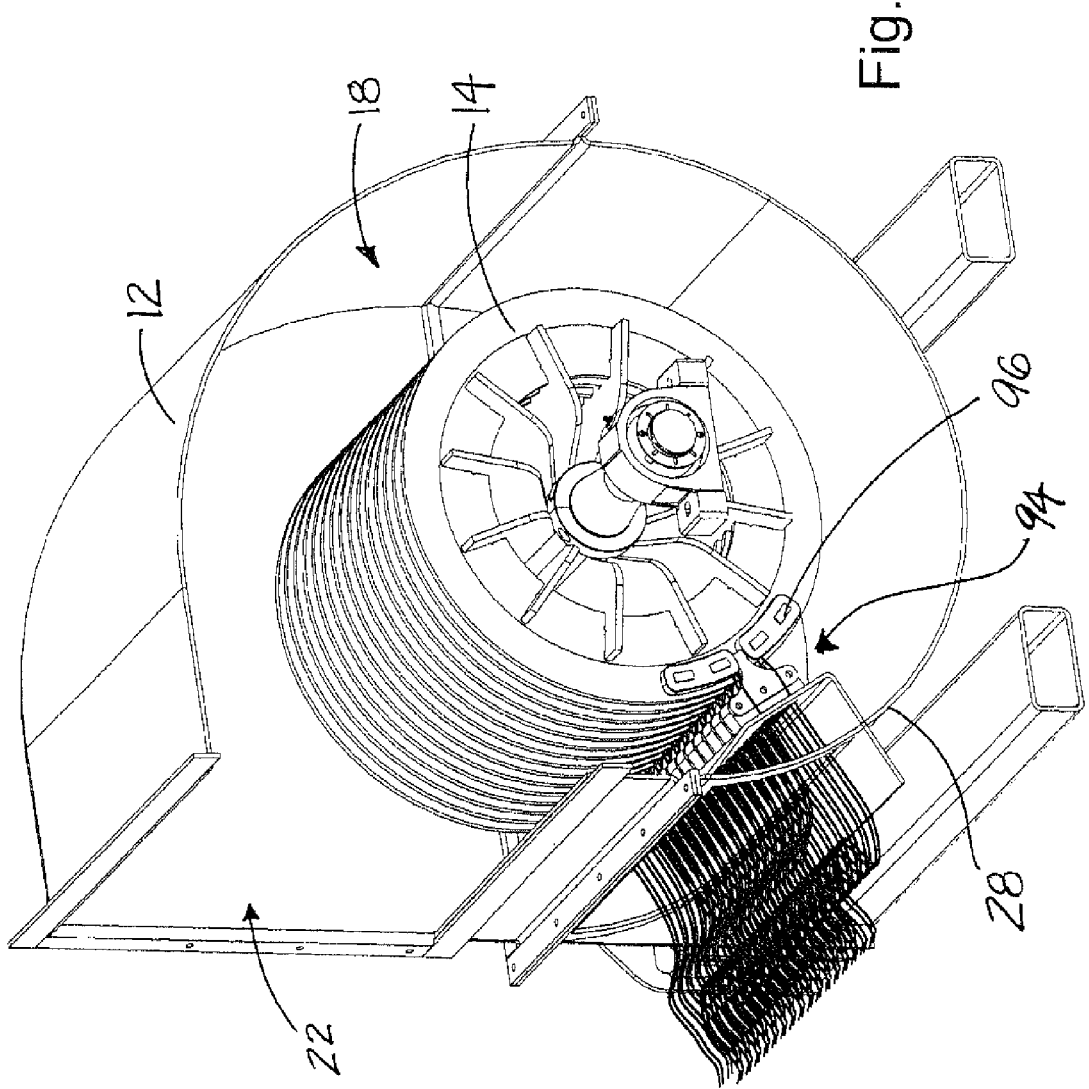
FIG. 10 is a schematic perspective view of an embodiment of the apparatus that utilizes an electromagnet assembly, and has portions of the housing removed to reveal detail of the electromagnet assembly.

An embodiment employing magnetic elements that are electromagnets is illustratively shown in FIG. 10. The apparatus 10 includes a bank or array 94 of a plurality of electromagnet assemblies 96 positioned between the disks. In embodiments utilizing electromagnets, the degree or intensity of the magnetic field applied to the disks is varied by the amount of current flowing through the wire of the electromagnet, rather than by the position of the magnet with respect to the disks, and therefore the array 96 may be relatively stationary with respect to the housing and the impeller assembly as a whole.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An apparatus for heating and impelling air, the apparatus comprising:

a housing having an interior and an air inlet and an air outlet;

an air heating impeller assembly positioned in the interior and configured to impel air through the housing and heat the air moving through the housing between the air inlet and air outlet, the impeller assembly being rotatable about an axis of rotation, the air heating impeller assembly comprising:

a support shaft extending along the axis of rotation and having an outer surface;

a plurality of annular disks positioned along the support shaft, each of the annular disks having a central aperture defined by an aperture edge, the support shaft extending through the central aperture of the disks;

a plurality of paddles radiating outwardly from the axis of rotation;

wherein each of the paddles is positioned between the support shaft and the annular disks to space the aperture edge of at least one of the disks from the outer surface of the support shaft to form a portion of an air path between the support shaft and the at least one disk; and wherein the paddles space the disks from each other in an axial direction to form gaps between the disks to form a portion of the air path between the paddles; and a magnetic assembly configured to apply a magnetic field of adjustable intensity to the disks to cause heating of the disks.

2. The apparatus of claim 1 wherein an air path between the air inlet and air outlet is partially defined by the impeller assembly, a first air path portion extending substantially parallel to the axis of rotation between the support shaft and the disks, and a second air path portion extending radially outward with respect to the axis of rotation between the disks.

3. The apparatus of claim 1 wherein the housing has a pair of air inlets located on opposite sides of the housing, the air impeller assembly being located between the air inlets with a first portion of the impeller assembly located adjacent to the first air inlet and a second portion of the impeller assembly located adjacent to the second air inlet, the impeller assembly defining a pair of the air paths, a first air path being defined by the first portion of the impeller assembly and a second air path being defined by the second portion of the impeller assembly.

4. The apparatus of claim 1 wherein the support shaft has opposite end sections and a central section with a plurality of axially extending grooves being formed in the central section, each of the paddles having an inner edge engaging one of the grooves in the support shaft.

5. The apparatus of claim 1 wherein each of the paddles has an outer edge, a plurality of slots being formed in each of the paddles and extending from the outer edge toward the inner edge of the paddles, the disks engaging the slots.

6. The apparatus of claim 1 wherein each of the disks has a plurality of interlocking notches extending radially outwardly from the central aperture, each of the interlocking notches engaging one of the paddles.

7. The apparatus of claim 1 wherein each of the paddles has an outer edge, a plurality of slots being formed in each of the paddles and extending from the outer edge toward the inner edge of the paddles, the disks engaging the slots; and wherein each of the disks has a plurality of interlocking notches extending radially outwardly from the central aperture, each of the interlocking notches engaging a slot on one of the paddles.

8. The apparatus of claim 1 wherein each of the paddles has a pair of side edges extending between inner and outer edges of the paddle, a width of the paddle being defined between the sides edges, the width of the paddle tapering narrower toward the inner edge and expanding wider toward the outer edge.

9. The apparatus of claim 1 wherein the plurality of disks includes a blocking disk to block movement of air in an axial direction along the support shaft to thereby force air to move in a radially outward direction from the axis of rotation.

10. The apparatus of claim 1 wherein the magnetic assembly comprises:

a plurality of magnetic elements positioned adjacent to the disks; and a support structure supporting the plurality of magnetic elements in the gaps between the disks, the support structure moving the magnetic elements between a maximum exposure position and a minimum exposure position.

11. The apparatus of claim 10 wherein the support structure comprises:

a pivot shaft pivotally mounted on the housing;

a plurality of mounting plates mounted on the pivot shaft and being pivotable with the pivot shaft, at least one of the magnetic elements being mounted on each of the mounting plates, the mounting plates being movable toward and away from the axis of rotation;

an actuator assembly for pivoting the pivot shaft to cause movement of the magnetic elements on the mounting plates.

12. The apparatus of claim 11 wherein the actuator assembly comprises:

a pivot arm mounted on the pivot shaft to pivot with the pivot shaft;

an actuator acting on the pivot arm to pivot the pivot shaft, the actuator being connected to the pivot arm and the housing to pivot the pivot shaft with respect to the housing.

* * * * *